(12) United States Patent
Kim

(10) Patent No.: US 11,745,422 B2
(45) Date of Patent: Sep. 5, 2023

(54) 3D PRINTING APPARATUS AND METHOD

(71) Applicants: Hyundai Motor Company, Seoul (KR); Kia Corporation, Seoul (KR)

(72) Inventor: Gyung Bok Kim, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/673,041

(22) Filed: Feb. 16, 2022

(65) Prior Publication Data

US 2023/0013514 A1    Jan. 19, 2023

(30) Foreign Application Priority Data

Jul. 15, 2021 (KR) ........................ 10-2021-0092672

(51) Int. Cl.
| | |
|---|---|
| *B29C 64/118* | (2017.01) |
| *B29C 64/209* | (2017.01) |
| *B29C 64/227* | (2017.01) |
| *B33Y 10/00* | (2015.01) |
| *B29C 64/295* | (2017.01) |
| *B29C 64/232* | (2017.01) |
| *B29C 64/236* | (2017.01) |
| *B33Y 30/00* | (2015.01) |
| *B33Y 40/00* | (2020.01) |
| *B29C 64/30* | (2017.01) |
| *B29C 64/321* | (2017.01) |

(52) U.S. Cl.
CPC .......... *B29C 64/209* (2017.08); *B29C 64/118* (2017.08); *B29C 64/227* (2017.08); *B29C 64/232* (2017.08); *B29C 64/236* (2017.08); *B29C 64/295* (2017.08); *B29C 64/30* (2017.08); *B29C 64/321* (2017.08); *B33Y 10/00* (2014.12); *B33Y 30/00* (2014.12); *B33Y 40/00* (2014.12)

(58) Field of Classification Search
CPC ..................................................... B29C 64/118
See application file for complete search history.

(56) References Cited

U.S. PATENT DOCUMENTS

| | | | |
|---|---|---|---|
| 10,906,234 B2 * | 2/2021 | Murao | ................... B29C 64/112 |
| 2016/0136897 A1 * | 5/2016 | Nielsen-Cole | ........ B29C 64/194 |
| | | | 425/150 |
| 2018/0126636 A1 * | 5/2018 | Jang | ..................... B29C 64/336 |
| 2019/0351575 A1 | 11/2019 | Dugbenoo et al. | |

(Continued)

FOREIGN PATENT DOCUMENTS

| | | | | | |
|---|---|---|---|---|---|
| CN | 2714287 | Y | * | 8/2005 | ............. B29C 48/92 |
| CN | 204505858 | U | * | 7/2015 | ............. B29C 64/20 |
| CN | 205889894 | U | * | 1/2017 | |

(Continued)

*Primary Examiner* — Atul P. Khare

(74) *Attorney, Agent, or Firm* — Slater Matsil, LLP

(57) ABSTRACT

An embodiment fused deposition modeling (FDM) type 3D printing apparatus includes a printing bed having a space for printing out an output on an upper surface thereof and a nozzle unit provided on the printing bed and configured to extrude a molten output material and print the molten output material out to the printing bed, the nozzle unit including a primary nozzle tip configured to primarily extrude the molten output material and a secondary nozzle tip selectively coupled to the primary nozzle tip and configured to secondarily extrude the molten output material.

20 Claims, 8 Drawing Sheets

(56) References Cited

U.S. PATENT DOCUMENTS

2020/0031046 A1\*  1/2020  Gjovik ................ B23K 26/147

FOREIGN PATENT DOCUMENTS

| CN | 206106391 U | \* | 4/2017 | |
|----|---|---|---|---|
| KR | 101430582 B1 | | 8/2014 | |
| KR | 101474689 B1 | | 12/2014 | |
| KR | 20150135567 A | \* | 12/2015 | ............. B29C 67/00 |
| KR | 101796890 B1 | | 11/2017 | |
| KR | 101938958 B1 | | 1/2019 | |
| KR | 20190062663 A | \* | 6/2019 | ............. B33Y 40/00 |
| KR | 20190062664 A | \* | 6/2019 | ........... B29C 64/209 |
| KR | 102030059 B1 | \* | 11/2019 | ............ B28B 1/001 |
| WO | WO-2019109114 A1 | \* | 6/2019 | ........... B29C 64/118 |
| WO | WO-2020033386 A1 | \* | 2/2020 | ........... B29C 64/106 |

\* cited by examiner

3D PRINTING APPARATUS AND METHOD

CROSS-REFERENCE TO RELATED APPLICATIONS

This application claims the benefit of Korean Patent Application No. 10-2021-0092672, filed on Jul. 15, 2021, which application is hereby incorporated herein by reference.

TECHNICAL FIELD

The present disclosure relates to a 3D printing apparatus and method.

BACKGROUND 3D printing is a technology for forming three-dimensional structural products, and has advantages of rapidly forming three-dimensional structures as well as producing shapes that cannot be assembled or disassembled. 3D printing has been studied in earnest for a long time. Conventionally, 3D printing has not been widely adopted, but it has been used only in limited fields such as the production of aerospace-related parts or the production of automobile prototypes, because the range of materials that can be 3D printed is limited and the equipment for 3D printing is expensive. However, 3D printing has recently come to be widely used in various fields, and the range of application thereof is expanding.

3D printing technology is broadly classified into various methods such as a FDM (Fused Deposition Modeling) method using solid materials, an SLA (Stereo Lithography Apparatus) method and a DLP (Digital Lighting Processing) method using liquid materials, and an SLS (Selective Laser Sintering) method using powdered materials.

Among them, the FDM method is a method of melting output materials (hereinafter, referred to as "filaments"), such as plastic, which are solid materials, and then stacking and forming outputs having a predetermined shape while outputting the melted output materials (hereinafter, referred to as "strands") through an extrusion nozzle. The FDM method enables implementation of 3D printing inexpensively and output of various colors, unlike other methods.

In order to print out the outputs using the FDM method, the extrusion nozzle for outputting the strands is moved in the X-axis, Y-axis and Z-axis directions in the state in which a printing bed on which the outputs are printed out is fixed, or the printing bed is moved in the X-axis, Y-axis and Z-axis directions in the state in which the extrusion nozzle is fixed.

The filaments are melted in the extrusion nozzle and the strands are then extruded in the XY plane, consisting of the X and Y axes, to form n layers. Here, the strands harden while cooling immediately after being extruded from the extrusion nozzle. An output having a desired shape is then formed by successively stacking n+1 layers on top of the n layers printed out in the XY plane, namely, in the Z-axis direction.

Meanwhile, the method of stacking and printing out outputs, such as the FDM method, involves a series of processes in which filaments are rapidly heated, melted, and then stacked due to the characteristics of the printing device. Thus, the method has a disadvantage in that the productivity of products is very low because the products must be printed out through a nozzle having a relatively small discharge hole (less than 1T).

Accordingly, an apparatus and method for printing out outputs through a large extrusion nozzle having a discharge hole of 2T or more have been studied continuously in recent years.

However, in the case of using the large extrusion nozzle, it takes a lot of time for output strands to harden to a desired level. In addition, since their output shapes are deformed while hardening progresses, it is difficult to secure Z-axis directional physical properties.

The foregoing is intended merely to aid in understanding of the background of the present disclosure, and is not intended to mean that the present disclosure falls within the purview of the related art that is already known to those skilled in the art.

SUMMARY

The present disclosure relates to a 3D printing apparatus and method. Particular embodiments relate to a 3D printing apparatus and method capable of improving Z-axis directional physical properties.

Therefore, embodiments of the present disclosure can solve problems in the art, and an embodiment of the present disclosure provides a 3D printing apparatus and method capable of improving Z-axis directional physical properties.

In accordance with an embodiment of the present disclosure, a 3D printing apparatus, which is an FDM (Fused Deposition Modeling)-type 3D printing apparatus, is provided. The 3D printing apparatus includes a printing bed having a space for printing out an output on an upper surface thereof, and a nozzle unit provided on the printing bed to extrude a molten output material and print it out to the printing bed, the nozzle unit including a primary nozzle tip configured to primarily extrude the molten output material and a secondary nozzle tip selectively coupled to the primary nozzle tip to secondarily extrude the molten output material.

The nozzle unit may include a cylinder configured to temporarily store the output material while melting the output material or transferring the output material that is kept molten. The primary nozzle tip may be fixed to an end of the cylinder and have a primary discharge hole formed to primarily extrude the molten output material, and the secondary nozzle tip may be selectively coupled to an end of the primary nozzle tip and have a secondary discharge hole formed to secondarily extrude the molten output material.

The secondary discharge hole may have a smaller cross-sectional area than the primary discharge hole.

The primary discharge hole may have a major axis of 2 mm or more in section.

The 3D printing apparatus may further include a feeder connected to the cylinder of the nozzle unit through a supply pipe to supply the output material to a nozzle, and a primary heater disposed on an outer peripheral surface of the cylinder to provide heat to the output material supplied to the cylinder.

The secondary nozzle tip may further include a secondary heater configured to provide heat to the output material extruded through the secondary nozzle tip.

The printing bed may further include a transfer unit configured to transfer the nozzle unit in X-axis, Y-axis, and Z-axis directions over the printing bed.

The transfer unit may include a pair of X-axis rails disposed in the X-axis direction at both edges of the printing bed, a pair of Z-axis rails disposed in the Z-axis direction on the respective X-axis rails and transferred in the X-axis direction along the X-axis rails, and a Y-axis rail having both ends connected to the respective Z-axis rails and transferred in the Z-axis direction along the Z-axis rails. The nozzle unit may be installed on the Y-axis rail provided with a transfer body that moves together with the nozzle unit in the Y-axis direction along the Y-axis rail.

In accordance with another embodiment of the present disclosure, a 3D printing method, which is an FDM (Fused Deposition Modeling)-type 3D printing method, is provided. The 3D printing method includes preparing a printout by melting an output material, printing out a first output, which includes an outer frame corresponding to an outer shape of a final output by extruding the molten output material and inner frames extending from an inner wall of the outer frame in the outer frame while maintaining a shape of the outer frame and forming a plurality of cavities in such a manner that the inner frames are spaced apart from each other, and printing out a secondary output, which is the final output, by filling the plurality of cavities formed within the primary output with the molten output material.

In the printing out a first output, the outer frame and the inner frames may form n layers having predetermined shapes in an XY plane consisting of an X-axis and a Y-axis, and then stack and form n+1 layers in a Z-axis direction.

In the printing out a first output, the inner frames may be in the form of a lattice.

In the printing out a first output, the plurality of cavities formed within the outer frame by the inner frame may extend in the Z-axis direction.

In the printing out a secondary output, the molten output material may be filled in the plurality of cavities formed in the primary output while being peened in a Z-axis direction.

In the printing out a secondary output, the molten output material may be filled in a selected one of the plurality of cavities formed in the primary output, and then filled in another cavity.

BRIEF DESCRIPTION OF THE DRAWINGS

The above and other objects, features and other advantages of embodiments of the present disclosure will be more clearly understood from the following detailed description taken in conjunction with the accompanying drawings, in which.

DETAILED DESCRIPTION OF ILLUSTRATIVE EMBODIMENTS

Figure 1:
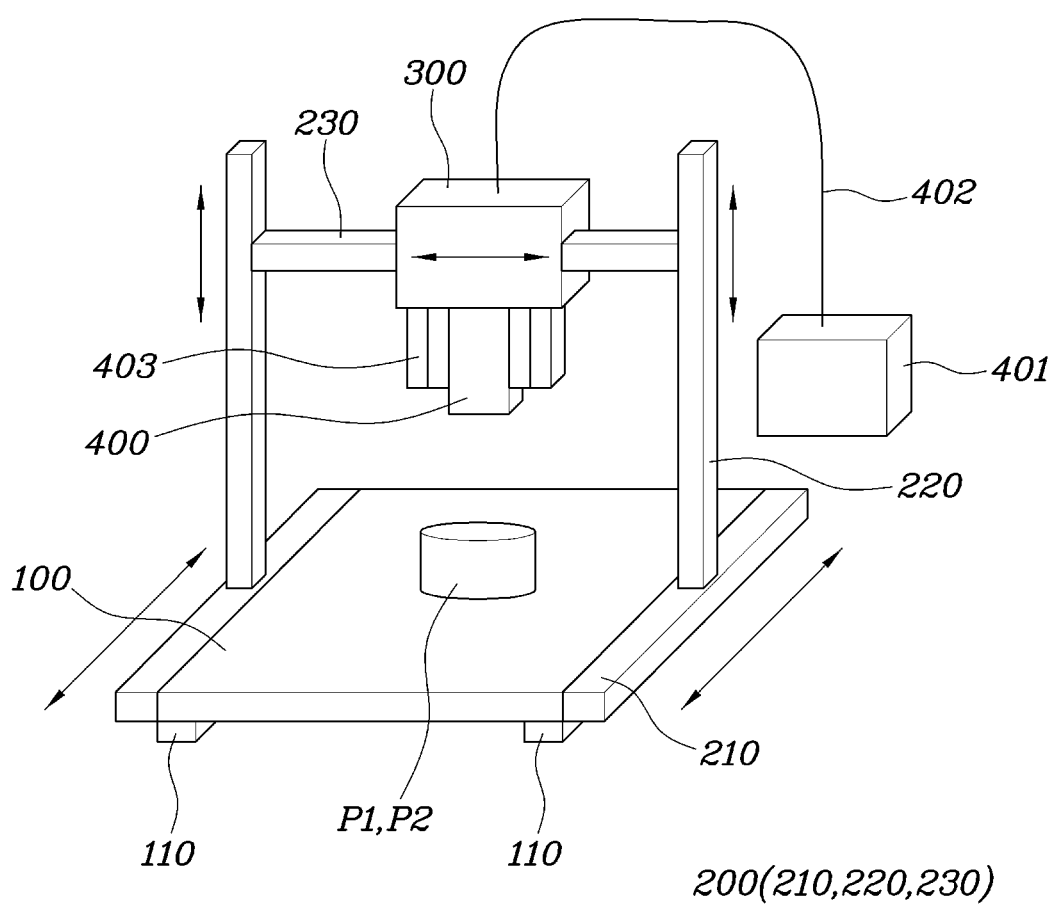
FIG. 1 is a view illustrating a 3D printing apparatus according to an embodiment of the present disclosure.

Exemplary embodiments of the present disclosure will be described below in more detail with reference to the accompanying drawings. The present disclosure may, however, be embodied in different forms, and should not be construed as being limited to the embodiments set forth herein. Rather, these embodiments are provided so that this disclosure will be thorough and complete, and will fully convey the scope of the present disclosure to those skilled in the art. In the drawings, like reference numerals refer to like elements.

Figure 2:
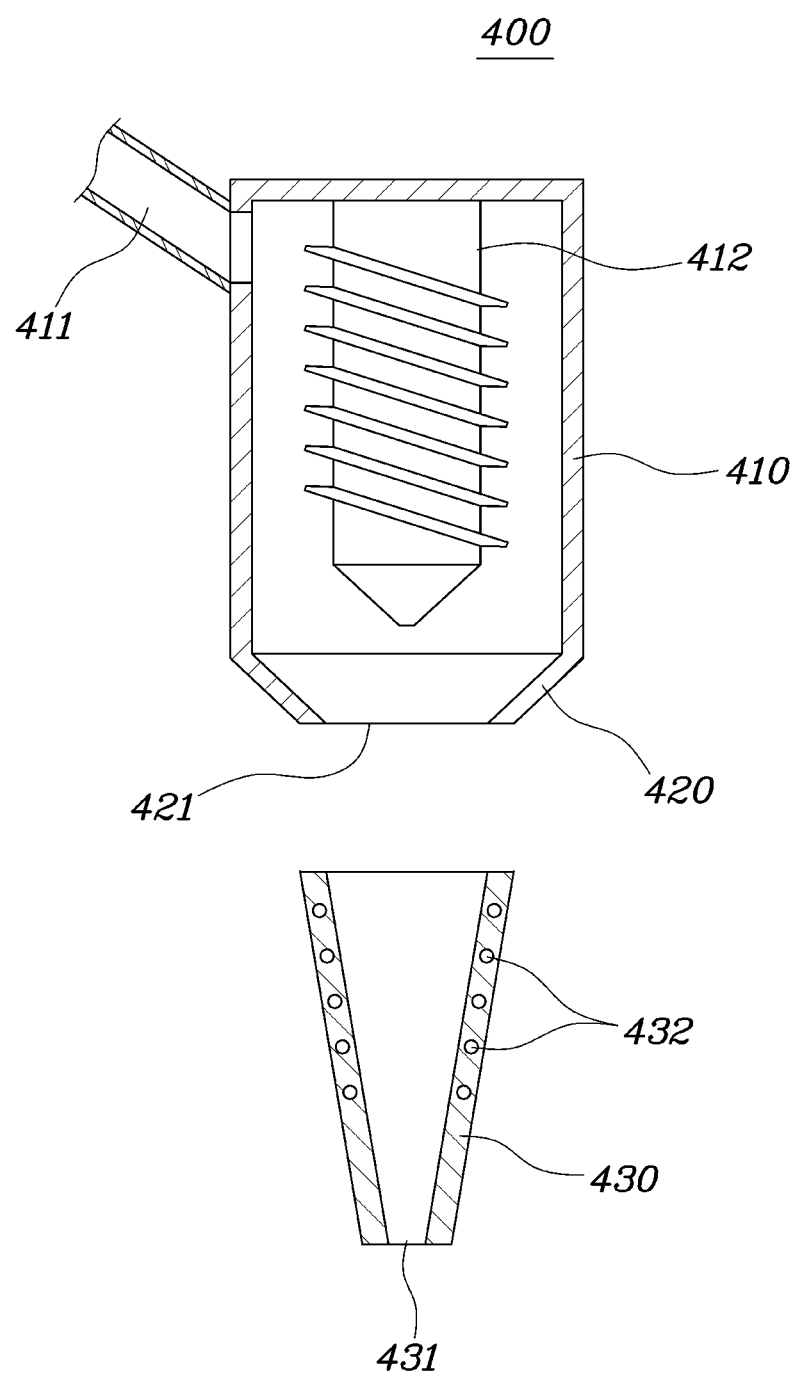
FIG. 2 is a view illustrating a nozzle unit of the 3D printing apparatus according to an embodiment of the present disclosure.
Figure 3A:
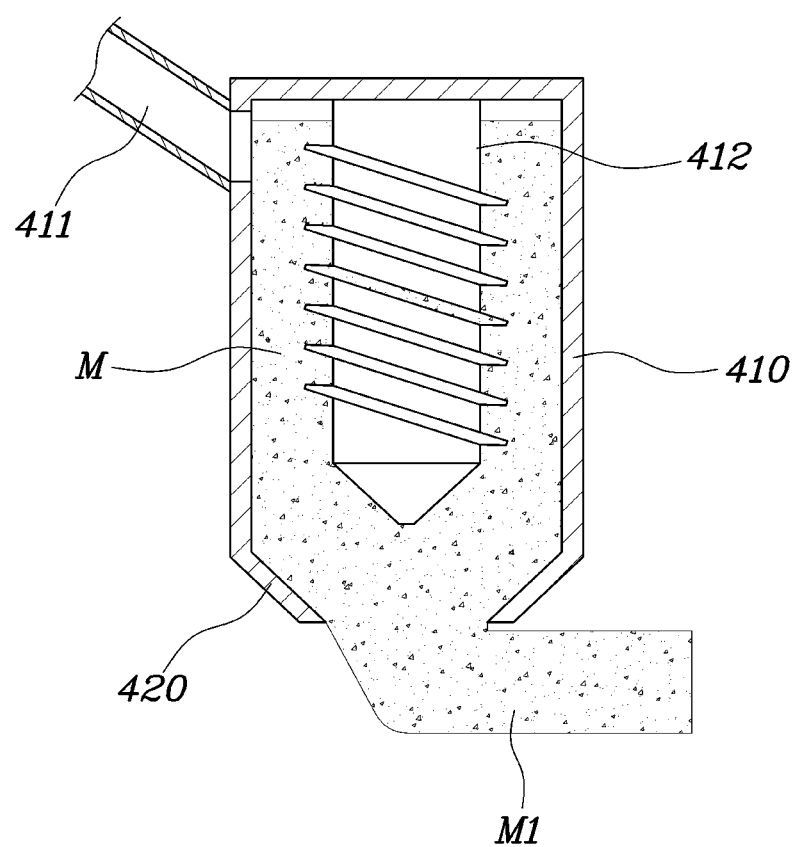
FIG. 3A is a view illustrating a state in which a primary nozzle tip is installed in the nozzle unit according to an embodiment of the present disclosure.
Figure 3B:
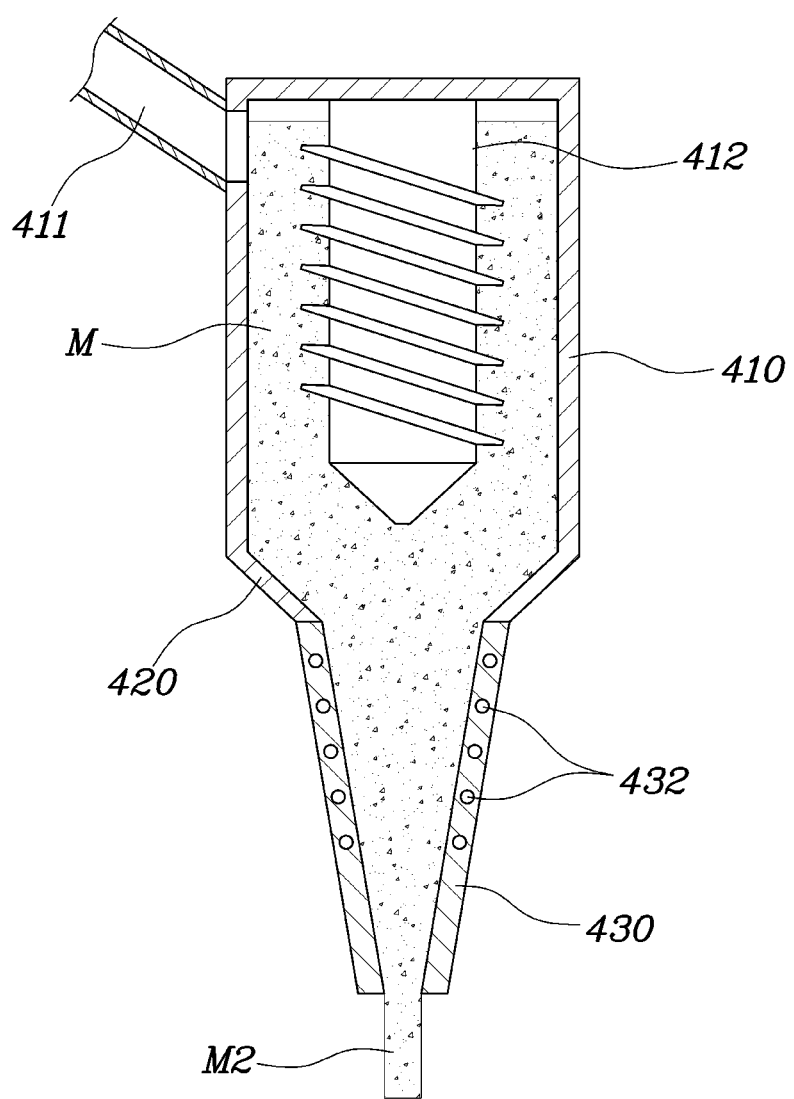
FIG. 3B is a view illustrating a state in which a secondary nozzle tip is installed together with the primary nozzle tip in the nozzle unit according to an embodiment of the present disclosure.

FIG. 1 is a view illustrating a 3D printing apparatus according to an embodiment of the present disclosure. FIG. 2 is a view illustrating a nozzle unit of the 3D printing apparatus according to an embodiment of the present disclosure. FIG. 3A is a view illustrating a state in which a primary nozzle tip is installed in the nozzle unit according to an embodiment of the present disclosure. FIG. 3B is a view illustrating a state in which a secondary nozzle tip is installed together with the primary nozzle tip in the nozzle unit according to an embodiment of the present disclosure.

As illustrated in the drawings, the 3D printing apparatus according to an embodiment of the present disclosure is applied to an FDM (Fused Deposition Modeling)-type 3D printing apparatus.

The 3D printing apparatus includes a printing bed 100 having a space for printing out an output on an upper surface thereof, and a nozzle unit 400 provided on the printing bed 100 to extrude a molten output material M and print it out to the printing bed 100.

The 3D printing apparatus further includes a transfer unit 200 configured to transfer the nozzle unit 400 in X-axis, Y-axis and Z-axis directions over the printing bed 100.

The printing bed 100 is a means for providing a space in which outputs P1 and P2 are printed out, and is installed, in the form of a plate having a flat upper surface, in an open space.

The printing bed 100 may further include a heating means (not shown) capable of adjusting the temperature of the printing bed 100.

Preferably, the printing bed 100 includes at least one vibrator no for vibrating the printing bed 100. Thus, the printing bed 100 may be vibrated during extrusion of the molten output material M2 in order to print out the secondary output P2, which is a final output, to the printing bed 100. In this case, the vibrator no preferably vibrates the printing bed 100 in the vertical direction, namely, in the X-axis direction.

The transfer unit 200 is a means for moving the nozzle unit 400 to a desired position over the printing bed 100 in order to print out the outputs P1 and P2 having desired shapes, and includes a transfer body 300 that moves the nozzle unit 400 in the X-axis, Y-axis, and Z-axis directions. The nozzle unit 400 is integrally coupled to the transfer body 300 so that the nozzle unit 400 is also moved in the X-axis, Y-axis, and Z-axis directions along with the movement of the transfer body 300 in the X-axis, Y-axis, and Z-axis directions.

The transfer unit 200 may be configured in different manners so as to transfer the transfer body 300 freely in the X-axis, Y-axis, and Z-axis directions. For example, the transfer unit 200 may be implemented in a gantry structure.

In other words, the transfer unit 200 includes a pair of X-axis rails 210 disposed in the X-axis direction at both edges of the printing bed 100, a pair of Z-axis rails 220 disposed in the Z-axis direction on the respective X-axis rails 210 and transferred in the X-axis direction along the X-axis rails 210, and a Y-axis rail 230 having both ends connected to the respective Z-axis rails 220 and transferred in the Z-axis direction along the Z-axis rails 220.

The Y-axis rail 230 is provided with the transfer body 300 that moves in the Y-axis direction along the Y-axis rail 230. Thus, the transfer body 300 may move freely in the X-axis, Y-axis, and the Z-axis directions over the printing bed 100.

Here, the transfer body 300 may be implemented in the form of a block transferred along the Y-axis rail 230.

Meanwhile, the nozzle unit 400 is a means for extruding the molten output material M to print it out to the printing bed 100. In particular, in this embodiment, the nozzle unit 400 includes a primary nozzle tip 420 for extruding a primary output material M1 in order to print out the primary output P1 and a secondary nozzle tip 430 for extruding a secondary output material M2 in order to print out the secondary output P2, which is a final output, and the primary and secondary nozzle tips 420 and 430 may be selectively used.

In other words, the nozzle unit 400 includes a cylinder 410 configured to melt the output material M and to transfer the output material M that is kept molten, the primary nozzle tip 420 fixed to the end of the cylinder 410 and having a primary discharge hole 421 formed to primarily extrude the molten output material M, and the secondary nozzle tip 430 selectively coupled to the end of the primary nozzle tip 420 and having a secondary discharge hole 431 formed to secondarily extrude the molten output material M.

The cylinder 410 has a cylindrical shape that has a space therein for melting or transferring the output material M. The cylinder 410 is provided therein with a transfer screw 412 for transferring the molten output material M toward the primary nozzle tip 420.

The cylinder 410 of the nozzle unit 400 is connected to a feeder 401 through a supply pipe 402, and the feeder 401 serves to supply a filament, which is a solid output material. To this end, the cylinder 410 has an insertion port 411 formed at one side thereof to communicate with the supply pipe 402.

The nozzle unit 400 further includes a primary heater 403 disposed on the outer peripheral surface thereof to provide heat to the output material M supplied to the cylinder 410. Here, the primary heater 403 may be provided to surround the outer peripheral surface of the cylinder 410 constituting the nozzle unit 400, but is not limited thereto. For example, the primary heater 403 may also be built into the wall of the cylinder 410.

The primary nozzle tip 420 is a means for primarily extruding the output material M transferred from the cylinder 410 in order to print out the primary output P1, and is installed at the end of the cylinder 410 while having the primary discharge hole 421 formed to discharge the primary output material M1.

Here, the primary nozzle tip 420 may be a large nozzle tip in order to improve the productivity of the product. For example, it is preferable that the primary discharge hole 421 formed in the primary nozzle tip 420 has a major axis of 2 mm or more.

The secondary nozzle tip 430 is a means for secondarily extruding the output material M transferred from the cylinder 410 in order to print out the secondary output P2 by filling a cavity 12 formed within the primary output P1 with the secondary output material M2. The secondary nozzle tip 430 is selectively installed at the end of the primary nozzle tip 420 and has the secondary discharge hole 431 formed to discharge the secondary output material M2.

Here, the secondary nozzle tip 430 may be coupled to the end of the primary nozzle tip 420 in different manners. For example, the secondary nozzle tip 430 may be screwed to the end of the primary nozzle tip 420 or may be coupled to the end of the primary nozzle tip 420 by a separate clamp. The coupling means of the primary nozzle tip 420 and the secondary nozzle tip 430 is not limited to a specific means.

The secondary nozzle tip 430 may be selectively coupled to the end of the primary nozzle tip 420 in various manners.

The secondary discharge hole 431 has a smaller cross-sectional area than the primary discharge hole 421 formed in the primary nozzle tip 420.

For example, the inlet of the secondary nozzle tip 430 is sized corresponding to the cross-sectional area of the primary discharge hole 421, but it is preferable that the secondary nozzle tip 430 has a gradually decreasing cross-sectional area toward the outlet thereof.

In particular, the outlet of the secondary nozzle tip 430 is preferably shaped corresponding to the cross section of the cavity 12 formed in the primary output P1, which will be described later. Accordingly, it is preferable to secondarily extrude the output material M in the state in which the end of the secondary nozzle tip 430 is in close contact with the cavity 12 of the primary output P1. Therefore, it is possible to expect a peening effect during the secondary extrusion of the output material M.

The secondary nozzle tip 430 may further include a secondary heater 432 configured to provide heat to the secondary output material M2 extruded through the secondary nozzle tip 430. Thus, the cavity 12 of the primary output P1 is filled with the secondary output material M2 extruded through the secondary nozzle tip 430 while the secondary output material M2 is kept molten.

A 3D printing method using the 3D printing apparatus configured as described above will be described below.

FIGS. 4A to 4D are views illustrating in stages a 3D printing method using the 3D printing apparatus according to an embodiment of the present disclosure.

Figure 4A:
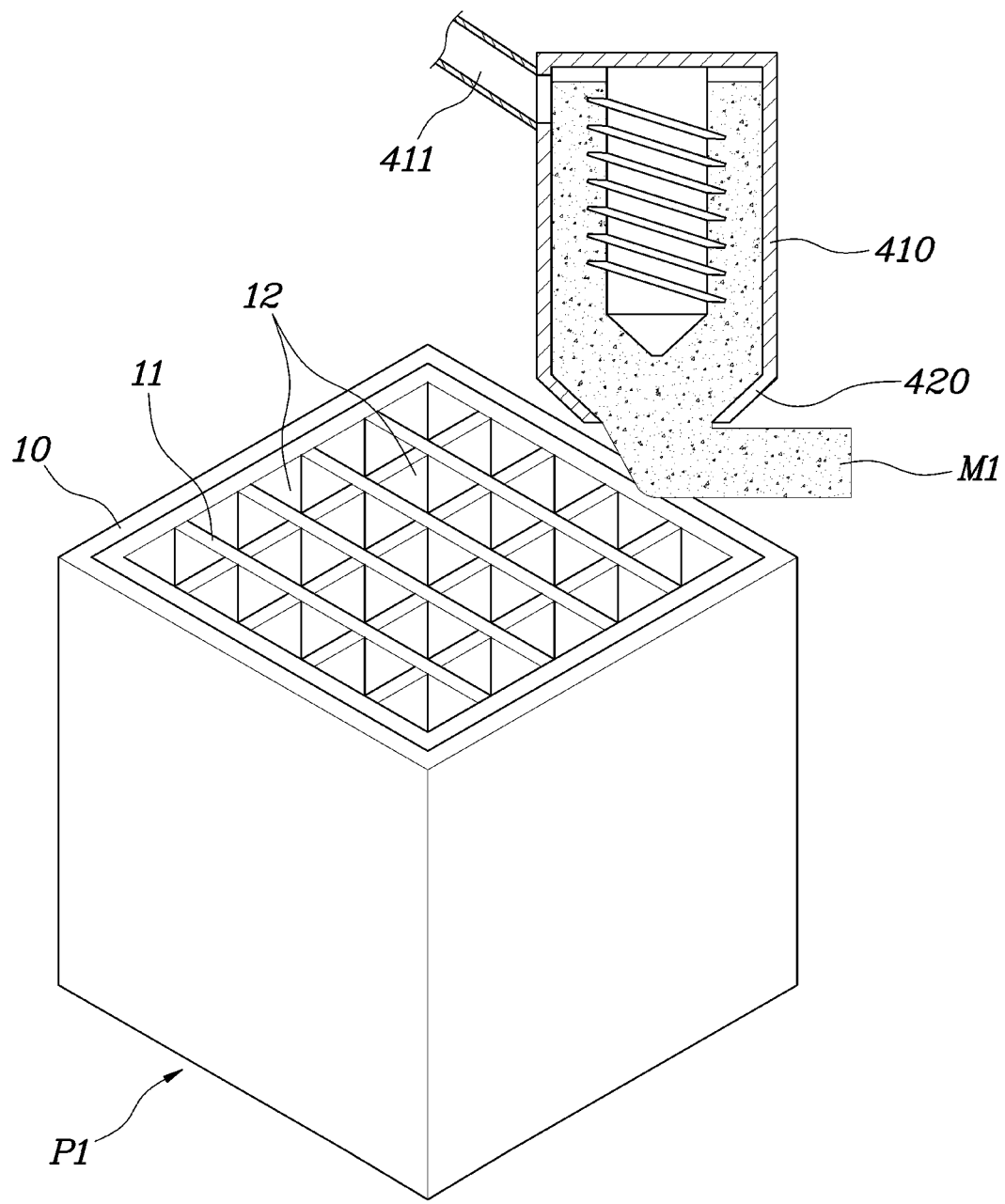
FIGS. 4A to 4D are views illustrating in stages a 3D printing method using the 3D printing apparatus according to an embodiment of the present disclosure.
Figure 4B:
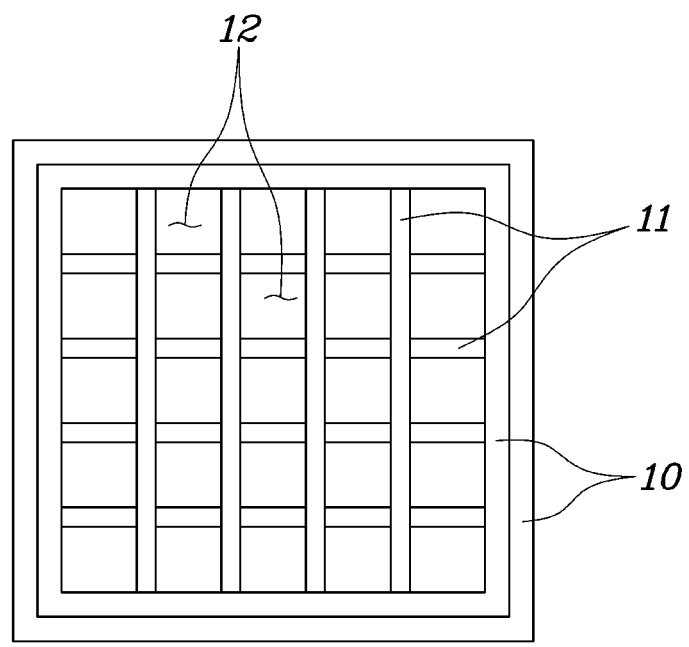
Figure 4C:
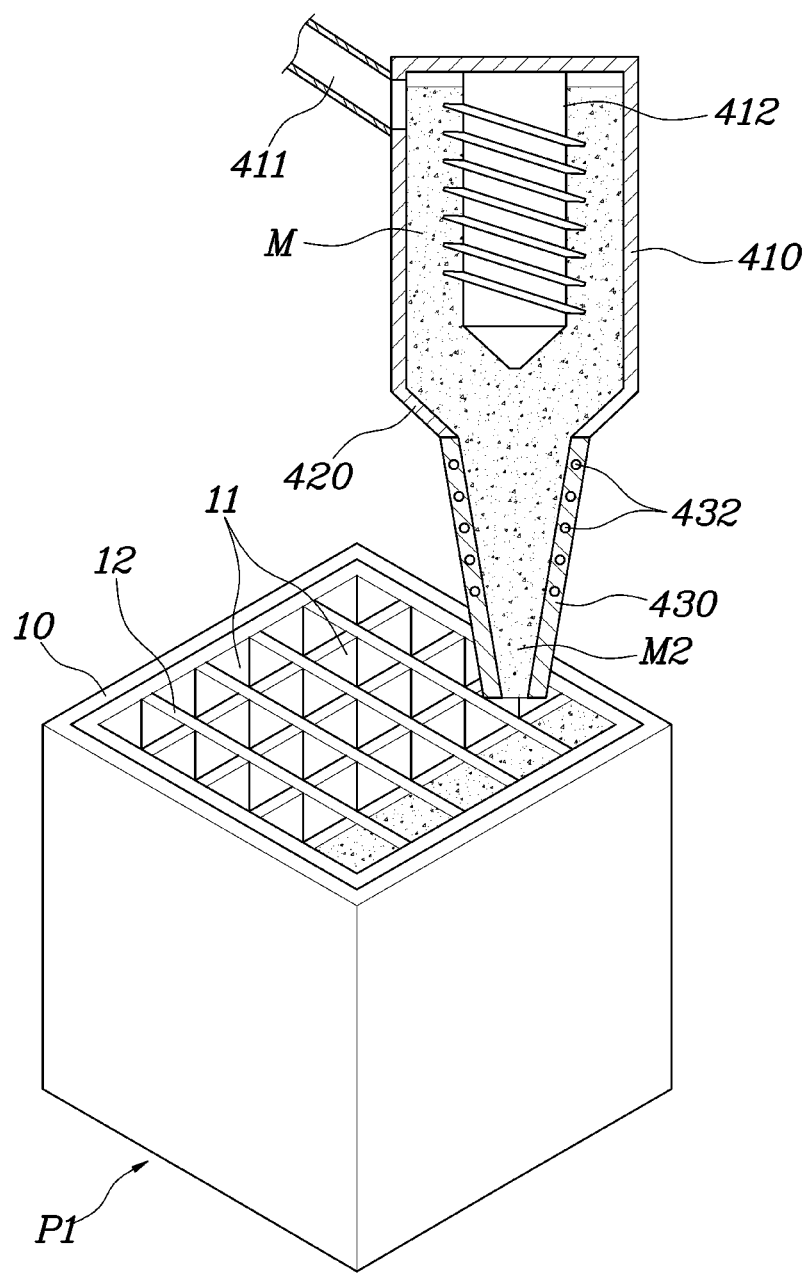
Figure 4D:
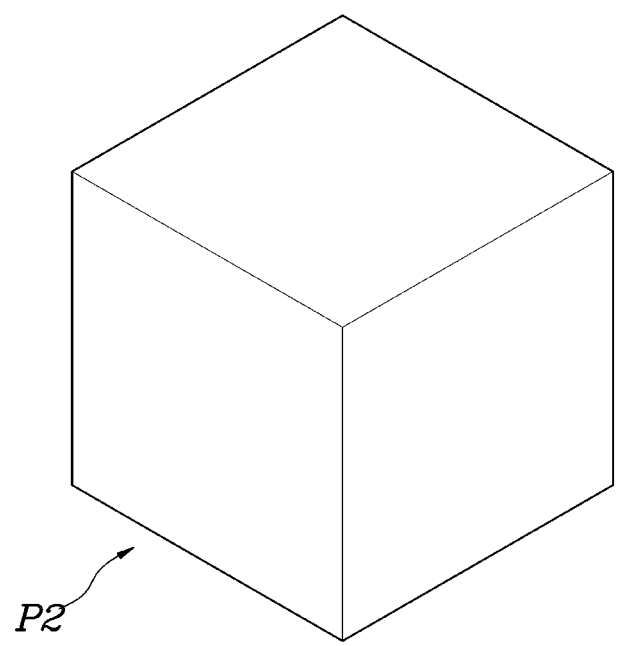

Here, FIG. 4B is a view illustrating a primary output printed out in FIG. 4A, and FIG. 4D is a view illustrating a secondary output printed out in FIG. 4C.

The 3D printing method according to the embodiment of the present disclosure is an FDM (Fused Deposition Modeling)-type 3D printing method, and includes a preparation step of preparing a printout by melting an output material M, a primary printout step of printing out a primary output P1 having a plurality of cavities 12 formed therein, and a secondary printout step of printing out a secondary output P2, which is a final output, by filling the plurality of cavities 12 formed within the primary output P1 with the molten output material M.

The preparation step is a step of preparing extrusion by melting the output material M. In the preparation step, a filament is supplied from the supply pipe 402 and inserted into the cylinder 410, in which case the filament is heated by the primary heater 403 so that the output material M is maintained in an extrudable state. The molten output material M is transferred toward the primary nozzle tip 420 by the operation of the transfer screw 412 provided in the cylinder 410.

The first printout step is a step of printing out the first output P1, which includes an outer frame 10 corresponding to the outer shape of the final output by extruding the molten output material M and inner frames 11 extending from the inner wall of the outer frame 10 in the outer frame 10 while maintaining the shape of the outer frame 10 and forming the plurality of cavities 12 in such a manner that the inner frames 11 are spaced apart from each other, as illustrated in FIGS. 4A and 4B.

The nozzle unit 400 is configured such that the primary output material M1 is extruded through the primary discharge hole 421 of the primary nozzle tip 420 by removal of the secondary nozzle tip 430.

Thus, the primary output P1 is printed out using the primary output material M1 that is relatively thick.

For example, the primary output P1 printed out in the primary printout step, namely, the outer frame 10 and the inner frames 11 form n layers having predetermined shapes while transferring the nozzle unit 400 including the primary nozzle tip in the XY plane consisting of the X-axis and the Y-axis using the transfer unit 200. The transfer unit 200 is transferred in the Z-axis direction and the nozzle unit 400 having the primary nozzle tip 420 is then transferred in the XY plane, so that n+1 layers are stacked and formed.

Preferably, the inner frames 11 are in the form of a lattice. Preferably, the plurality of cavities 12 formed within the outer frame 10 by the lattice-shaped inner frame 11 extend in the Z-axis direction.

In the secondary printout step, it is possible to expect a peening effect in the Z-axis direction while the secondary output material M2 in a molten state is extruded into the cavities 12.

In particular, it is preferable that each of the cavities 12 has a cross-sectional shape corresponding to the shape of the outlet of the secondary nozzle tip 430. Thus, extruding the secondary output material M2 with the secondary nozzle tip 430 close to or in contact with the top of the cavity 12 can maximize a peening effect in the Z-axis direction to the secondary output material M2 that is extruded and filled in the cavity 12.

The secondary printout step is a step of printing out the secondary output material P2, which is a final output, by filling the plurality of cavities 12 formed within the primary output P1 with the molten secondary output material M2, as illustrated in in FIGS. 4C and 4D.

The nozzle unit 400 is configured such that the secondary output material M2 is extruded through the secondary discharge hole 431 by coupling the secondary nozzle tip 430 to the end of the primary nozzle tip 420. In this case, the secondary output material M2 is the same output material M as the primary output material M1.

Thus, the secondary output P2 is printed out using the secondary output material M2 that is relatively thin.

For example, in the secondary printout step, the molten secondary output material M2 is filled in the plurality of cavities 12 formed in the primary output P1 while being peened in the Z-axis direction.

Here, filling while peening means that the secondary output material M2 is extruded in the Z-axis direction and the molten secondary output material M2 is filled in the cavities 12 in the Z-axis direction. Therefore, by continuously applying a load in the Z-axis direction to the secondary output material M2 filled in the cavities 12, the filling density of the secondary output material M2 filled in the cavities 12 can be maximized. Accordingly, no pore occurs in the secondary output material M2 filled in the cavities 12. In particular, since no pore occurs even at the interface with the primary output material P1, the bonding strength can be improved.

Meanwhile, in the secondary printout step, it is preferable that the molten secondary output material M2 is filled in a selected one of the plurality of cavities 12 formed in the primary output P1, and is then filled in another cavity 12. Therefore, the secondary output material M2 filled in one cavity 12 is formed in a manner that is integrally cast rather than stacked in several layers. Accordingly, since the secondary output material M2 filled in each cavity 12 is maintained in a state in which the Z-axis physical properties thereof are reinforced than those of the primary output material P1 while being integrated with the primary output material P1 after hardening, it will partially serve as a reinforcement.

Therefore, the secondary output P2 printed out in this way is maintained in a state in which the Z-axis physical properties thereof are improved as a whole.

As is apparent from the above description, it is possible to dramatically improve the Z-axis directional physical properties of the final output, by first printing out the outer frame corresponding to the outer shape of the final output and the inner frames forming the plurality of cavities while reinforcing the outer frame and then filling the plurality of cavities formed in the outer frame with the output material while peening the output material.

In addition, it is possible to increase the productivity of the product since the large extrusion nozzle having the discharge hole of 2T or more is available when printing out the primary output forming the outer frame and the inner frames.

In typical FDM-type 3D printing, the toughness thereof is low because the time for the output material to melt and harden after printout is relatively short. However, according to the embodiments of the present disclosure, it is possible to sufficiently secure the time for the print material filled in the cavities to gradually harden since the final print is formed by filling the cavities of the primary print with the print material while peening the print material. Therefore, it is possible to improve the toughness of the final output.

Although the present disclosure has been described with reference to the accompanying drawings and the above-mentioned preferred embodiments, the present disclosure is not limited thereto, but is defined by the following claims. Therefore, it will be apparent to those skilled in the art that various changes and modifications may be made without departing from the spirit and scope of the invention as defined in the following claims.

What is claimed is:

1. A fused deposition modeling (FDM) type 3D printing apparatus, the 3D printing apparatus comprising:
   a printing bed; and
   a nozzle unit provided on the printing bed to extrude and print a molten material out to the printing bed, the nozzle unit comprising a primary nozzle tip configured to extrude a primary output of the molten material to the printing bed and a secondary nozzle tip configured to be selectively coupled to an end of the primary nozzle tip to extrude a secondary output of the molten material smaller than the primary output to the printing bed, the secondary nozzle tip comprising a heater built into a wall thereof.

2. The 3D printing apparatus according to claim 1, wherein:
   the nozzle unit comprises a cylinder configured to melt a supply of the material and to transfer the molten material toward the primary nozzle tip;
   the primary nozzle tip is fixed to an end of the cylinder and has a primary discharge hole configured to primarily extrude the molten material; and
   the secondary nozzle tip is detachably coupled to an end of the primary nozzle tip and has a secondary discharge hole configured to secondarily extrude the molten material.

3. The 3D printing apparatus according to claim 2, wherein the secondary discharge hole has a smaller cross-sectional area than the primary discharge hole.

4. The 3D printing apparatus according to claim 3, wherein the primary discharge hole has a major axis of 2 mm or more in section.

5. The 3D printing apparatus according to claim 2, further comprising:
   a feeder connected to the cylinder of the nozzle unit through a supply pipe, the feeder being configured to supply the material to the nozzle unit; and
   a primary heater configured to heat the material supplied to the cylinder.

6. The 3D printing apparatus according to claim 5, wherein the heater of the secondary nozzle tip is configured to heat the material extruded through the secondary nozzle tip.

7. The 3D printing apparatus according to claim 3, wherein an inlet of the secondary discharge hole is sized according to the cross-sectional area of the primary discharge hole.

8. The 3D printing apparatus according to claim 5, wherein the primary heater is disposed on an outer peripheral surface of the cylinder.

9. The 3D printing apparatus according to claim 5, wherein the primary heater is built into a wall of the cylinder.

10. The 3D printing apparatus according to claim 2, wherein the cylinder is provided therein with a transfer screw for transferring the molten material toward the primary nozzle tip.

11. The 3D printing apparatus according to claim 1, wherein the printing bed further comprises a transfer unit configured to transfer the nozzle unit in X-axis, Y-axis, and Z-axis directions over the printing bed.

12. The 3D printing apparatus according to claim 11, wherein the transfer unit comprises:
   a pair of X-axis rails disposed in the X-axis direction at opposing edges of the printing bed;
   a pair of Z-axis rails each disposed in the Z-axis direction on a respective one of the X-axis rails and movable in the X-axis direction along the X-axis rails; and
   a Y-axis rail having opposing ends thereof connected to a respective one of the Z-axis rails and movable in the Z-axis direction along the Z-axis rails.

13. The 3D printing apparatus according to claim 12, wherein the nozzle unit is installed on the Y-axis rail, the Y-axis rail further provided with a transfer body configured to move together with the nozzle unit in the Y-axis direction along the Y-axis rail.

14. The 3D printing apparatus according to claim 1, wherein with the secondary nozzle tip coupled to the end of the primary nozzle tip, the nozzle unit is configured to form the secondary output by extruding the molten material sequentially through the primary nozzle tip and the secondary nozzle tip.

15. A fused deposition modeling (FDM) type 3D printing method using the 3D printing apparatus according to claim 1, the 3D printing method comprising:
   melting a supply of the material to form the molten material;
   printing out the primary output by extruding the molten material from the primary nozzle tip, the primary output forming an outer frame corresponding to an outer shape of an object and inner frames extending between inner walls of the outer frame, wherein the inner frames are spaced apart from each other by a plurality of cavities formed between the inner frames;
   coupling the secondary nozzle tip to the end of the primary nozzle tip; and
   printing out the secondary output by extruding the molten material from the secondary nozzle tip so as to fill the molten material into the plurality of cavities.

16. The 3D printing method according to claim 15, wherein printing out the primary output to form the outer frame and the inner frames comprises:
   forming n layers of the molten material having predetermined shapes in an XY plane consisting of an X-axis and a Y-axis; and
   stacking and forming n+1 layers of the molten material in a Z-axis direction.

17. The 3D printing method according to claim 16, wherein the inner frames form a lattice structure.

18. The 3D printing method according to claim 16, wherein the plurality of cavities extend in the Z-axis direction.

19. The 3D printing method according to claim 15, wherein printing out the secondary output comprises filling the plurality of cavities with the molten material while the molten material is peened in a Z-axis direction.

20. The 3D printing method according to claim 19, wherein printing out the secondary output comprises filling the molten material in a first cavity of the plurality of cavities, and then filling the molten material in a second cavity of the plurality of cavities.

* * * * *